United States Patent [19]

Elliott et al.

[11] Patent Number: 5,606,600
[45] Date of Patent: Feb. 25, 1997

[54] GENERALIZED STATISTICS ENGINE FOR TELEPHONE NETWORK EMPLOYING A NETWORK INFORMATION CONCENTRATOR

[75] Inventors: Isaac K. Elliott; Richard D. Terpstra, both of Colorado Springs; James H. Richards, Monument; Phillip Catalano, Colorado Springs; Mark A. Campbell, Colorado Springs; Timothy F. Uttormark, Colorado Springs, all of Colo.

[73] Assignee: MCI Communications Corporation, Washington, D.C.

[21] Appl. No.: 438,926

[22] Filed: May 10, 1995

[51] Int. Cl.⁶ .......................... H04M 3/08; H04M 15/00; H04M 3/42; H04M 7/00
[52] U.S. Cl. ................ 379/112; 379/13; 379/14; 379/113; 379/114; 379/115; 379/207; 379/219; 379/220
[58] Field of Search ..................... 379/1, 13–15, 379/34, 111–115, 201, 207, 219, 220

[56] References Cited

U.S. PATENT DOCUMENTS

| | | | |
|---|---|---|---|
| 4,022,978 | 5/1977 | Connell et al. | 379/113 |
| 4,385,206 | 5/1983 | Bradshaw et al. | 379/112 |
| 4,935,956 | 6/1990 | Hellwarth et al. | 379/114 |
| 4,988,209 | 1/1991 | Davidson et al. | 379/113 |
| 5,023,868 | 6/1991 | Davidson et al. | 379/112 |
| 5,159,698 | 10/1992 | Harrington et al. | 379/112 |
| 5,233,642 | 8/1993 | Renton | 379/111 |
| 5,259,023 | 11/1993 | Katz | 379/127 |
| 5,263,080 | 11/1993 | Jones et al. | 379/88 |
| 5,282,244 | 1/1994 | Fuller et al. | 379/112 |
| 5,333,183 | 7/1994 | Herbert | 379/112 |
| 5,343,517 | 8/1994 | Bogart | 379/112 |
| 5,355,403 | 10/1994 | Richardson | 379/34 |

Primary Examiner—Wellington Chin
Assistant Examiner—Vijay Shankar

[57] ABSTRACT

Data incorporated in call detail records (CDR), obtained from network switches, are subjected to processing by a statistics engine which maintains separate counts for CDR events relating to certain calls, such as 800 number and 900 number calls. Such events, such as attempted calls, completed calls, and duration, form statistics for network users. Compilation of statistics may be done for different services, such as total summary counts and counts by originating area code. In the case of 800 numbers, the statistical counts for the various services are compiled in accordance with the 800 number or 900 number called. When a network user decides to change the statistical services required, it is easily accomplished by changing the rules for interrogating the CDR data, as opposed to the prior art approach of changing programming coding. A network information concentrator collects, at a single point, call records from various network elements. This enables the concentrator to create data buffers of CDRs that are input to the statistics engine for processing.

7 Claims, 16 Drawing Sheets

COUNT REGISTRY 94

**NUMBER CALLED-(800) 254-6575
SERVICE-TOTALS SUMMARY**

| STATISTIC | COUNT |
|---|---|
| ATTEMPTED | 2 |
| COMPLETED | 1 |
| • | |
| • | |

COUNT GROUP 90

**NUMBER CALLED-(800) 254-6575
SERVICE-AREA CODE (NPA)**

| STATISTIC | COUNT |
|---|---|
| ATTEMPTED | 1 |
| COMPLETED | 0 |
| • | |
| • | |
| • | |
| • | |

COUNT GROUP 92

*FIG. 6*

GENERALIZED STATISTICS ENGINE FOR TELEPHONE NETWORK EMPLOYING A NETWORK INFORMATION CONCENTRATOR

RELATED APPLICATIONS

The present application relates to co-pending application Ser. Nos. 08/438,914, filed May 10, 1995 entitled "A Method for Acquiring Statistics In A Telephone Network Employing Flexibly Changeable Rules", and 08/438,918, filed May 10, 1995, entitled "Generalized Statistics Engine for Telephone Network".

FIELD OF THE INVENTION

The present invention relates to a distributed computer processing system in a telephone network which collects preselected statistical data from call detail records as a phone call is switched through a network. A network information concentrator collects call record data, at a single point, from widely distributed adjunct processors.

BACKGROUND OF THE INVENTION

FIG. 1 illustrates a prior art system for collecting certain preselected statistical data concerning call detail records of a call being switched through a telephone network, such as 800 and 900 number calls. For example, a company offering 800 number service may be interested in knowing certain statistical counts concerning customer use of the service. One example would be the geographical origination, by customer, of 800 calls.

FIG. 1 illustrates a conventional system, as employed in the MCI Telephone Network, with reference numeral 10 indicating a call origination point. The call is transferred, along line 12, to the first network switch 14. Typically, a call is transferred to additional switches, such as switch 16, along line 18. The function of routing an 800 number call to a final destination is the responsibility of the data access point (DAP) 24. The structure and function of the DAP is detailed in U.S. Pat. No. 5,095,505, issued to the present assignee. The DAP responds with the routing information, along line 20, to switch 16 and to switch 14, via lead 18. As switches 14 and 16 complete their switching operation for the call being processed, respective adjunct processors (AP) 30 and 32 buffer the data of the respective call detail records (CDR) along switch outputs 26 and 28. A DAP Traffic Statistics processor (DTS) 40 receives count information concerning the data from the CDRs from switches 14 and 16. This count information is available to users, located downstream (46) of a traffic view server (TVS) 44, the latter being connected to the output of the DTS along interconnection line 42. It should be explained that the nomenclature "users" as mentioned in this description refers to the companies offering 800 number service to their customers. These companies are interested in various statistical counts concerning the activity of 800 and 900 number service offered by them to their customers. For brevity, in the description that follows, only 800 number service will be referred to.

In the prior art discussed in connection with FIG. 1, the DTS is quite limited in that it usually represents a single processor that can only handle a certain number of users and limited statistical counts concerning 800 number service. Further, an additional limitation regarding the DTS is that it requires code changes in its programming if the network user is interested in obtaining different types of statistics as time goes on. Accordingly, it has become necessary to increase the capacity and flexibility of a statistics gathering processor also known as a statistics engine.

BRIEF DESCRIPTION OF THE PRESENT INVENTION

The present invention is directed to a generalized statistics engine (GSE) architecture which has a substantially greater capacity than the DTS of the prior art. Further, as different statistics are to be kept, programming for the GSE is done by changes to decisional rules, as opposed to changes in code.

The invention includes a network information concentrator for collecting call records at a single point. This enables the creation of buffers for call detail records (CDR) generated at originating switches. The statistics are acquired from successive CDRs relative to a particular number called.

In order to more fully appreciate the concept of the present invention, reference is again made to FIG. 1, and, specifically, the DTS. This unit collects CDR data and counts the number of occurrences of certain events. Grouping of such events is referred to as a service, which is made available to users. For example, one such service can include summary totals of various events, such as the number of call completions, the number of attempts to call a termination point, and the total duration of all 800 number calls.

A number of users find a further breakdown of 800 number calls to be more useful. Thus, a second service is offered whereby events are counted in accordance with originating area code. For example, within a particular area code, the total number of attempts and completions may be counted and made available to a subscribing user.

In a similar fashion, a further breakdown or service may be made available to users whereby the individual events are acquired by terminating address. Thus, completions and total call duration for a particular termination address can also be obtained.

As indicated in the discussion of the prior art, a problem with the DTS of the prior art is its lack of flexibility for quickly changing events to be counted when an end user so desires. Thus, if an end user wishes to have the summary total statistics service in addition to certain events of other services, changes to the programming codes, for the DTS, must be made and debugged. This is a time-consuming and expensive process which is accomplished more simply by the present invention—that replaces the DTS. The present invention utilizes a generalized statistics engine, to be explained hereinafter, that counts the occurrence of events for the various services by applying rules that are easily modified when an end user is interested in changing the statistic services for its 800 number operation.

BRIEF DESCRIPTION OF THE FIGURES

The above-mentioned objects and advantages of the present invention will be more clearly understood when considered in conjunction with the accompanying drawings, in which:

FIG. 6 is a schematic illustration of a Count Registry for storing statistic counts in accordance with the present invention.

DETAILED DESCRIPTION OF THE INVENTION

Figure 1:
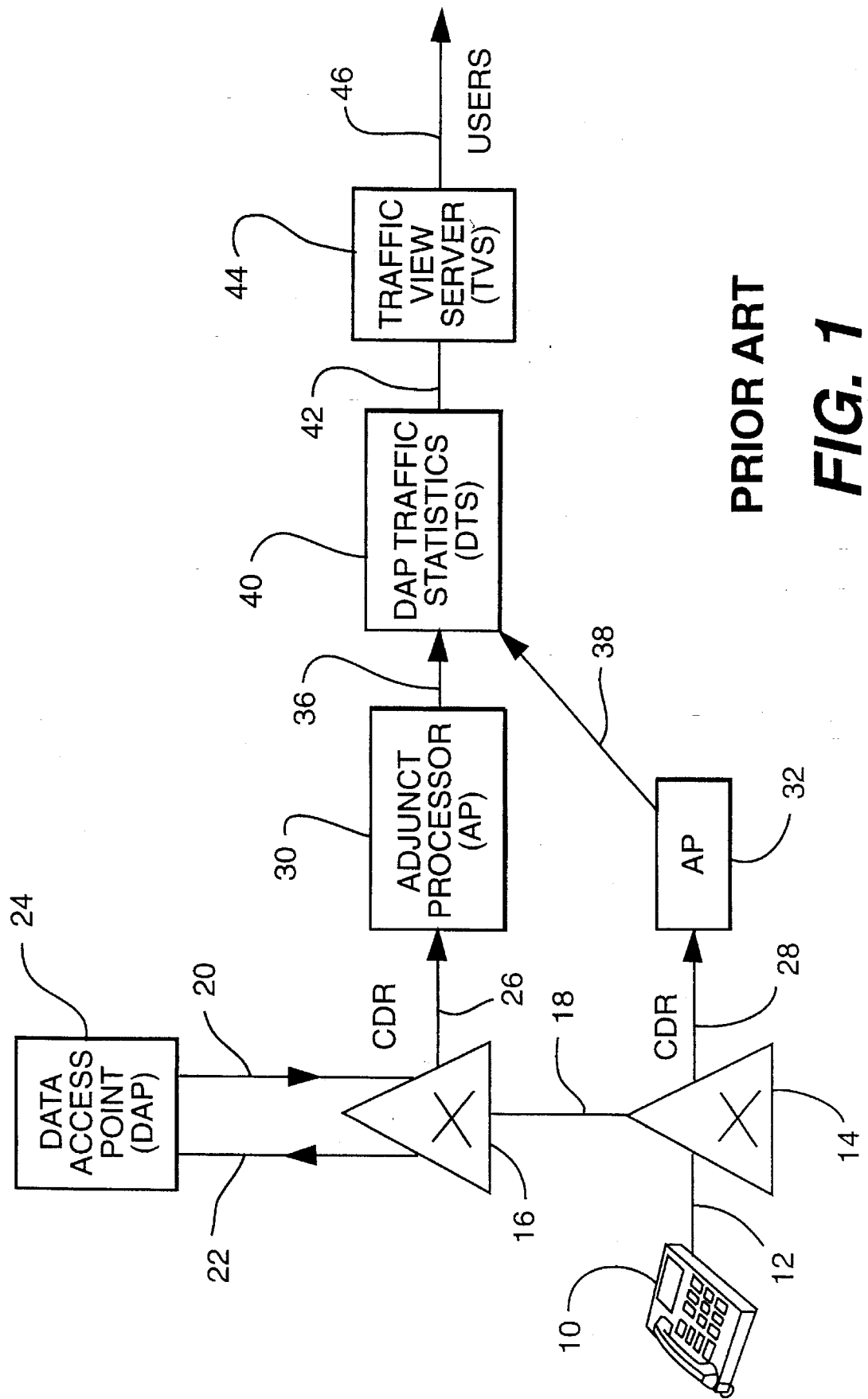
FIG. 1 is a block diagram of a prior art architecture incorporating a DAP traffic statistics engine.
Figure 2:
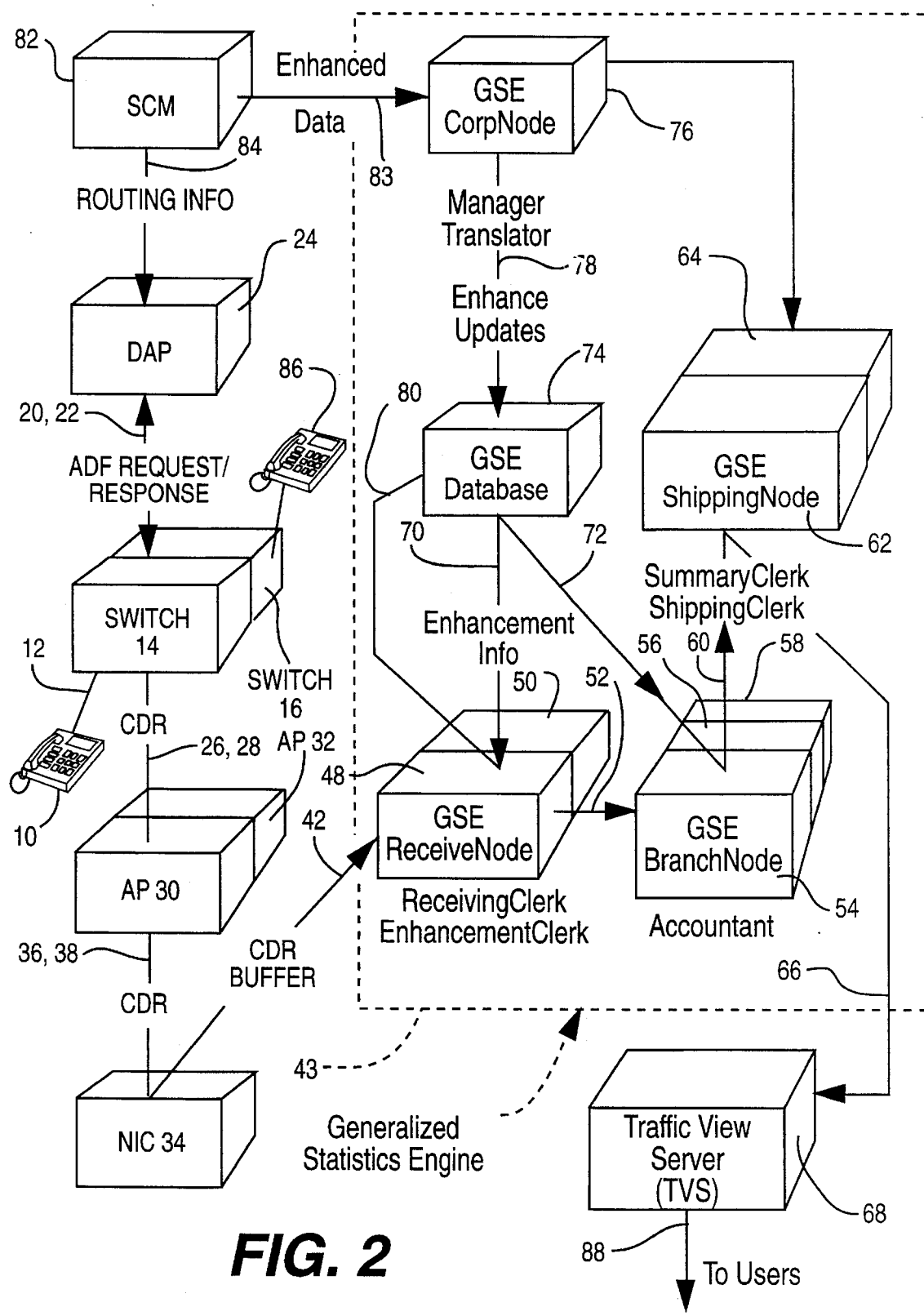
FIG. 2 is a block diagram of the architecture incorporating a novel generalized statistics engine, as employed in the present invention.

Referring to FIG. 2, the DTS has been replaced by a number of other components which constitute the novel architecture of the present invention. The front end of the network, described in connection with FIG. 1, is repeated in FIG. 2, and similar components are similarly numbered. These common components include origination point 10, switches 14, 16, DAP 24 and APs 30 and 32.

A Service Control Manager (SCM) 82 accepts order entry and modification information from backend systems of the network which define true terminations of virtual phone numbers such as 800 and 900 numbers. Therefore, dialed 800 and 900 number calls have true routing information conveyed from the SCM to an involved DAP 24 along line 84.

The ability of the SCM to provide routing information is conventional. Instead of feeding the DTS of the prior art, the AP output lines 36, 38 carry CDR buffers (data) to a distributed processor, referred to herein as a network information concentrator (NIC) 34. The structure and operation of the NIC is discussed in greater detail hereinafter and is the subject matter of co-pending patent application Ser. No. 08/426,256 (1643/012). It is incorporated herein by reference. Suffice it to say at this point, the NIC 34 filters the data included in the CDR buffers so that only selected data is passed on (42) to the remainder of the system for statistical processing, thus expediting the process. This latter identified data serves as the input to the generalized statistics engine (GSE 43) of the present invention, which derives statistical counts of events dealing with calls. It is common for larger users of 800 number services to desire statistical information concerning 800 call events. For example, this would include information regarding call attempts, completions, duration, etc.

Statistic Hierarchy

FIG. 6 is a schematic representation of the statistic hierarchy employed in connection with the present invention. At the top of the figure, a called 800 number is indicated as (800) 254-6575. For this 800 number, a network user may be interested in obtaining a summary of statistic totals within a time period, for example, on an hourly basis. This defines a Totals Summary service. For this Totals Service, statistics are gathered from the CDRs relating to the total number of attempted calls, completed calls, etc. For each of these statistics, an updated count is maintained. The relationship of the individual statistic events and their corresponding counts is defined as a Count Group. The Count Group for the Totals Summary service is indicated by reference numeral 90. A second Count Group 92 is indicated for the same 800 number but with statistics for a different service. In this case, the service relates to all calls made to the same 800 number from a particular area code. This may be referred to as an NPA service. In the case of this service, typical statistics again include attempted and completed calls. However, unlike the previous example in connection with Count Group 90, the Count Group 92 statistics relate to calls made from the particular area code.

Other services relating to the 800 number may be tracked for a particular network user. The relationship of all Count Groups for the various services, is maintained in a Count Registry 94. In the example shown in FIG. 6, only two services are indicated, namely, Totals Summary and Area Code. This set of services constitutes a Service Vector. As the number of services are tracked for a Count Registry, the Service Vector is expanded.

Figure 3:
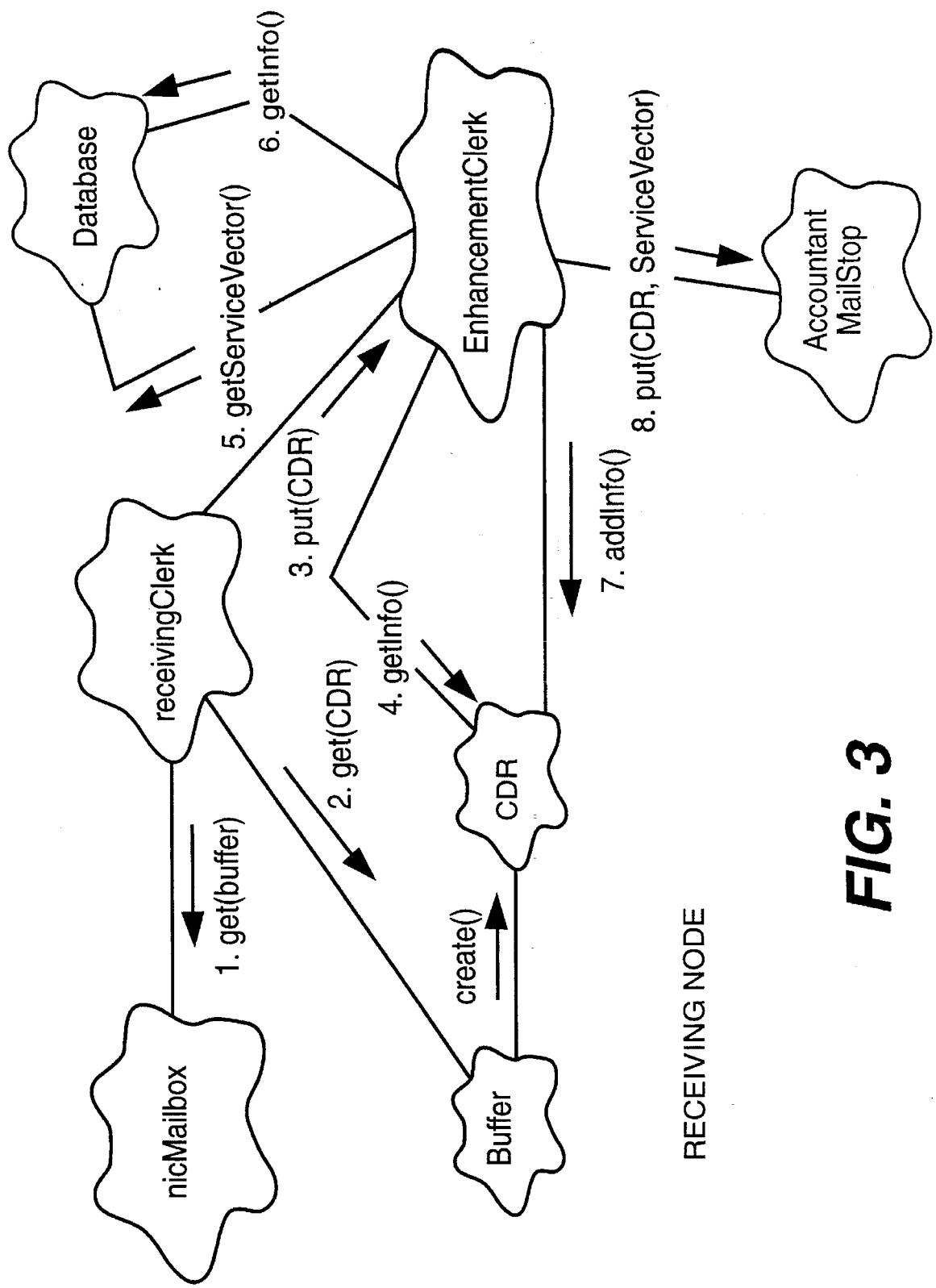
FIG. 3 is an object diagram of a receiving node, as employed in the generalized statistics engine.
Figure 4:
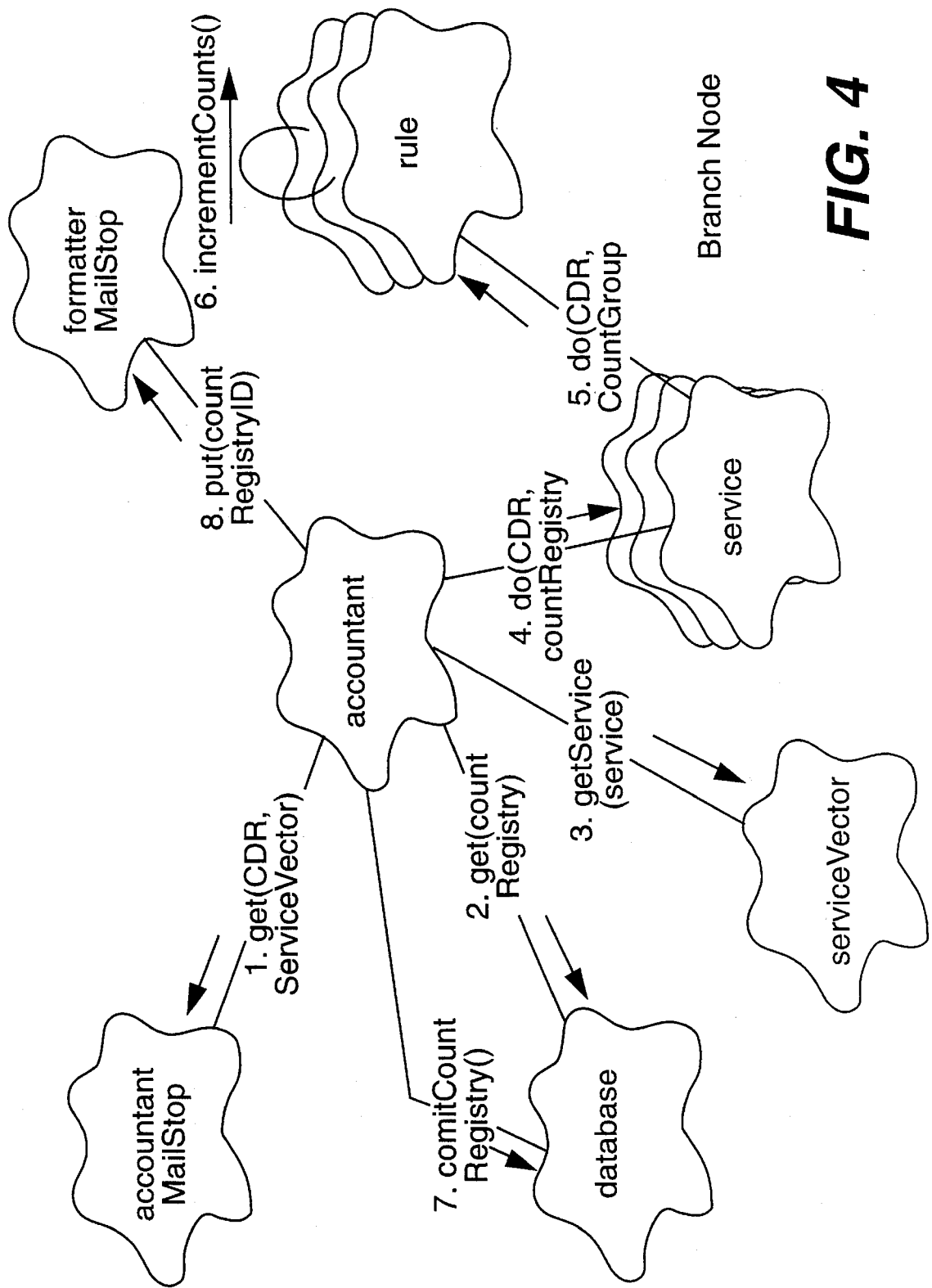
FIG. 4 is an object diagram of a branch node, as employed in the generalized statistics engine.
Figure 5:
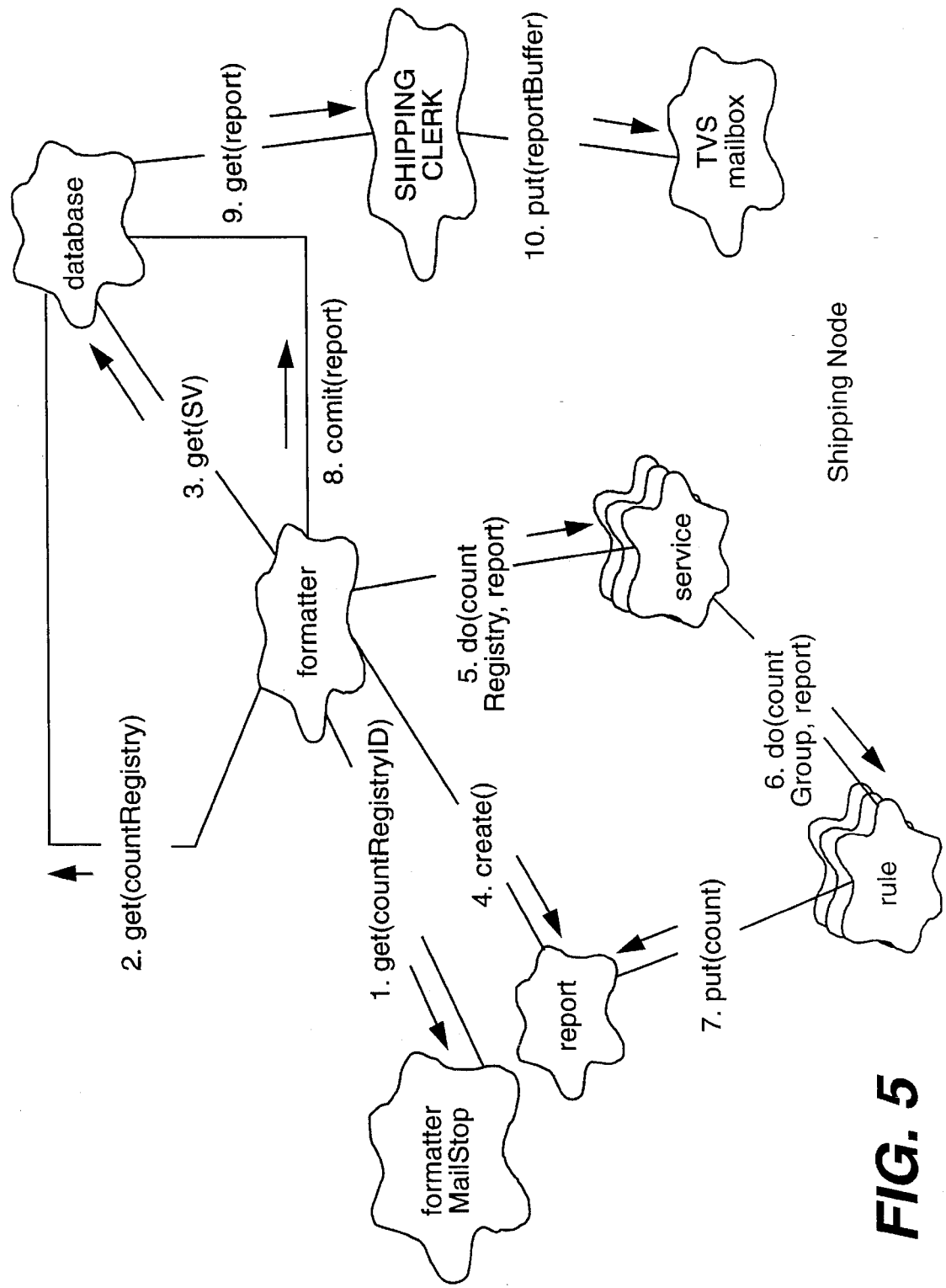
FIG. 5 is an object diagram of a shipping node, as employed in the generalized statistics engine.

The GSE 43 preferably takes the form of a distributed processor. The architecture for the GSE will now be discussed in connection with FIG. 2. This is followed by an explanation of object diagrams (FIGS. 3–5). Initial processing occurs in multiple receive nodes, such as 48 and 50, which operate similarly, but distribute the incoming CDR buffers (42). In terms of hardware implementation, the various nodes of the GSE 43 may be DEC processors defined as Alpha Sable. These processors use the OSF/1 operating system. A first process accomplished by the receive node 48 is referred to as a "receivingClerk" process. Qualitatively, this process unbundles individual CDRs from incoming buffers 42.

Each of the receive nodes 48, 50 implements a second process, referred to as an "enhancementClerk". The function of this process is to check each CDR against a look-up table contained within the database 74 for selecting 800 numbers for which statistics are to be tracked. The information concerning the 800 numbers to be tracked is transferred from the database 74 to the receive nodes 48, 50, via line 70. Typically, only those users who have subscribed to the statistics service may have their 800 number calls tracked for statistic evaluation. The receive nodes 48 and 50 then transfer the CDRs of interest to one of several branch nodes 54, 56, 58. The branch nodes are identical and operate in a round-robin fashion to distribute the incoming load from the receive nodes. The branch node contains a process referred to as the "Accountant". This process completes statistical counts of preselected statistical network events. In the example previously given for a statistic service corresponding to summary total events, the service involved would relate to a totals summary, and the individual events for that service would include items such as total attempts, total completions, and total duration for calls. The array of services selected is referred to as a service vector and it contains a pointer into the database 74. In this manner, the enhancementClerk of the receive nodes 48, 50 may obtain a service vector, along line 80 and the receive node 48 may process for a specific service vector which constitutes a series of pointers back into the database 74. A service vector and a corresponding CDR is then transferred to an appropriate branch node (54–60) where an Accountant Process performs a statistics count for each of the events covered by each service included in the service vector.

The database 74 also provides the rules for incrementing counts relating to the individual network events of a service. The decisional rules are provided to the branch nodes 54, 56 and 58 from the database, along line 72.

A further node is referred to as the corporate node 76 which receives enhanced data, normally missing from a CDR. One example is area code information that certain older phone systems are unable to provide for the CDR. In this circumstance, by virtue of the trunk and line number for the call, the area code can be deduced and this information provided to the corporate node. A translator process provides the enhanced data updates to the database 74, via line 78. From the database, the enhancement information may be provided to the receive node, as indicated in FIG. 2, along line 70. The corporate node 76 also includes a manager process which is an alarm server for the other GSE processes. This node further has the responsibility of selecting the various branch nodes 54, 56 and 58 in a manner distributing the incoming CDR load to the branch nodes. In a preferred embodiment of the invention, the corporate node is implemented with a DEC Alpha 3600 processor. Periodically, the corporate node signals the end of a statistic acquisition cycle to the receive nodes 48 and 50. Then, the Accountant process of the branch nodes 54, 56 and 58 apply the rules to particular services, as dictated by database 74.

The corporate node 76 also provides a Summary Clerk process, on the shipping nodes 62 and 64, with pointer information for statistics. The shipping nodes, receiving the statistics data along line 60 formats the statistic information into a message format, and conveys it to a Traffic View Server 68, along connecting line 66. A Traffic View Server is a database depository for the statistics which can be accessed by subscribing users (88).

Object Diagrams of GSE

The following discussion of FIGS. 3–5 relate to the receiving, branch, and shipping nodes, as briefly mentioned in FIG. 2. These FIGS. are object diagrams, also known as Booch diagrams. This type of diagram is explained in the publication *Object-Oriented Analysis and Design with Applications* by Grady Booch, Second Edition (1994). The publisher is Benjamin/Cummings.

Receiving Node

Beginning in FIG. 3, object diagrams for the generalized statistics engine are indicated in connection with sequenced path numbers. The receivingClerk is a process which obtains buffer data from NIC 34 (FIG. 2) which has been filtered so that, in the present example, only 800 numbers for subscribing users will be included in the buffer data from the NIC. This is indicated by path 1. Path 2 indicates the receivingClerk sorting individual CDRs from a buffer wherein CDRs, from the NIC, are stored. Each sorted CDR is created as a separate entity, as indicated by the CDR object in the diagram.

In certain instances, the created CDR has insufficient information. For example, for calls generated on older rotary dial phones, area code information is not directly indicated in the CDR. However, the enhancementClerk process is often capable of determining the area code of a call from other information in the CDR. In order to complete this task, the enhancementClerk obtains the necessary information from the CDR, such as the dialed 800 number. This is indicated by path 4. Before completing its process, the enhancementClerk queries the indicated database (72 in FIG. 2) to determine whether a user has requested a group of services for the particular 800 number. This corresponds to path number 5 in the FIG. If the database (72 in FIG. 2) includes such a group of services, known as a Service Vector, the necessary additional information is obtained from the database (72 in FIG. 2) (along path 6) so as to enhance the CDR by the enhancementClerk. The additional information, for enhancement, is provided to the initially lacking CDR so that it becomes enhanced. This is indicated by path 7. The enhancementClerk can then provide an enhanced CDR and the Service Vector to a hardware buffer interface, referred to in FIG. 3 as the accountantMailStop. In order to communicate the CDR and Service Vector data, in a preferred embodiment of the present invention, conventional TCP/IP protocol is employed. Such communication allows the branch node to further process the CDR and Service Vector data.

Branch Node

FIG. 4 indicates an object analysis of the branch node which centers about the accountant process. As indicated along path 1, the accountant obtains the enhanced CDR and Service Vector data from the accountantMailStop buffer of FIG. 3. This aspect of the branch node is represented by path 1.

As a second path, the accountant gets a Count Registry from a database (72 in FIG. 2). The Count Registry is a set of count groups corresponding to a particular Service Vector as pulled from the accountantMailStop.

In path number 2, the accountant retrieves a Count Registry which includes a set of count groups corresponding to a Service Vector. In actuality, the accountant will maintain Count Registries for all 800 number users. Along path 3, the accountant obtains an identification of each service, in connection with a Service Vector, as subscribed to by a user.

Path 4 corresponds to the accountant forming a data message with the statistics of individual services included in a Service Vector. From this point, path 5 is followed to further breakdown the form message to involve CDRs and Count Groups. Decisional rules are applied, based on a CDR, to determine whether statistics relating to each service should have their counts incremented. Path 6 indicates an incrementing of the statistics counts where the CDR indicates is appropriate. Updated statistics result in an updated Count Registry which is stored back into the database (72 in FIG. 2). In a preferred embodiment of the present invention, the accountant periodically closes the Count Registry and the aforementioned execution of rules. Incrementing of the counts then occurs. Then, the process is repeated to obtain an updated Count Registry. The location in the database (72 in FIG. 2), where the updated Count Registry exists, is assigned a Count Registry ID. In path 8, that ID is forwarded to the formatterMailStop (a buffer) indicated in FIG. 4. The purpose of that buffer is to format the count data into a message that can be downloaded to the shipping node of FIG. 5.

The initial function of the shipping node is for a formatter process to obtain the Count Registry ID from the formatterMailStop, which was the endpoint of FIG. 4. Using this ID, the most recent Count Registry may be obtained from the database (72 in FIG. 2), as indicated along path 2. The formatter retrieves the Service Vector corresponding to the Count Registry in order to create a data message format corresponding to a report shell, as indicated in path 4.

Along path 5, the pertinent Count Registry is sorted by service so that Count Groups are obtained along with the report shell. At the end of path 6, rules are fired which involve decisional logic to determine which statistics from a Count Group are to be included in the report (path 7). The items covered by the report will depend upon the particular service being subscribed to by the network user.

The shippingClerk process retrieves the report from the database as an object (path 9). The shippingClerk then puts the report in a buffer along path 10 where there is a conversion of the report to bitstream data in the form of a usable data message buffer.

Decisional Rules

Figure 7:
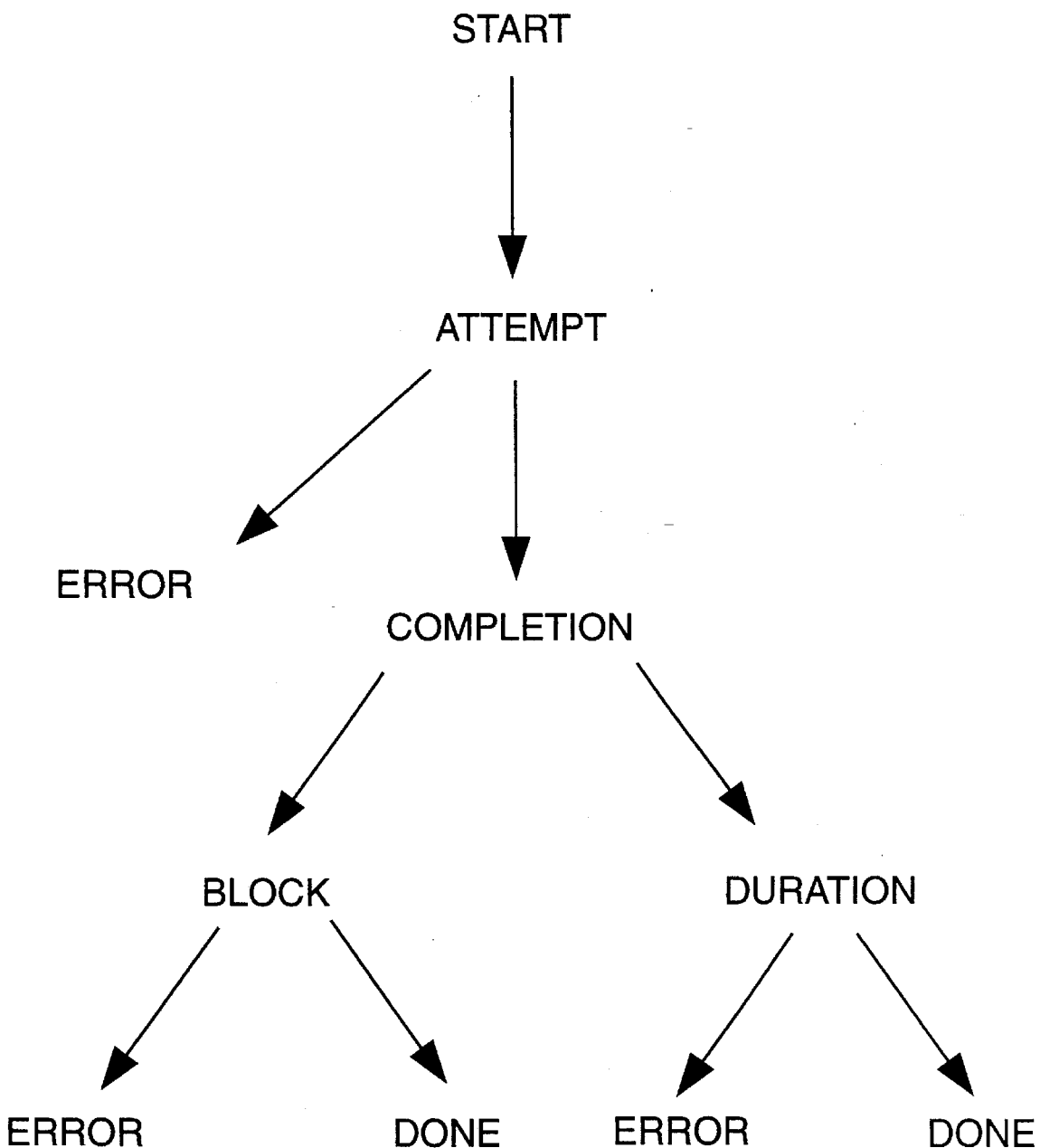
FIG. 7 is a schematic tree diagram of a rule for determining whether counts should be incremented in a particular statistics service, in accordance with the present invention.

FIG. 7 is a diagrammatic illustration of a typical rule applied during processing by the GSE. The illustrated example specifically shows the rule for the Totals Summary service, as explained in connection with FIG. 6. At the start, the data for a CDR is reviewed to ensure that a call has been attempted. In the event that it is not, an error signal is returned and the application of rules to the CDR is terminated. If an attempt has been completed, the count is incremented in the Count Group 90 (FIG. 6). Next, a check is made to see whether the call was completed. In the event it was not, the rule progresses to determine whether the call was blocked. If it was not, application of the rule is terminated since the lack of completion and the lack of a block is synonymous with an error. In the event that a block is detected, an appropriate entry (not shown) would be made in Count Group 90 and application of the rule is thereby completed. As further indicated in FIG. 7, if there is a completion, the rule continues to a determination of the call duration from data contained in the CDR. The duration would constitute a separate count (not shown) updated within the Count Group 90 (FIG. 6). In the event that the CDR did not include duration information, an error would be returned, and the duration count would not be incremented. It should be mentioned that, in FIG. 7, the rule includes a block statistic event. However, in reality, a number of different types of blocks would form the statistics event. However, in reality, a number of different types of blocks would form the statistics for which individual counts would be kept.

A great advantage of the present invention as compared with the prior art is seen to reside in the ability of the network to provide easily changed statistics by correspondingly altering the services provided. Statistics for each newly requested service is simply obtained by applying rules relating to counts for the statistics of a service. This is in marked contrast to changing the programming codes and debugging such changes, each time a network user requests a change in the statistic services rendered, as performed in the prior art.

Network Information Concentrator (NIC)

Figure 8:
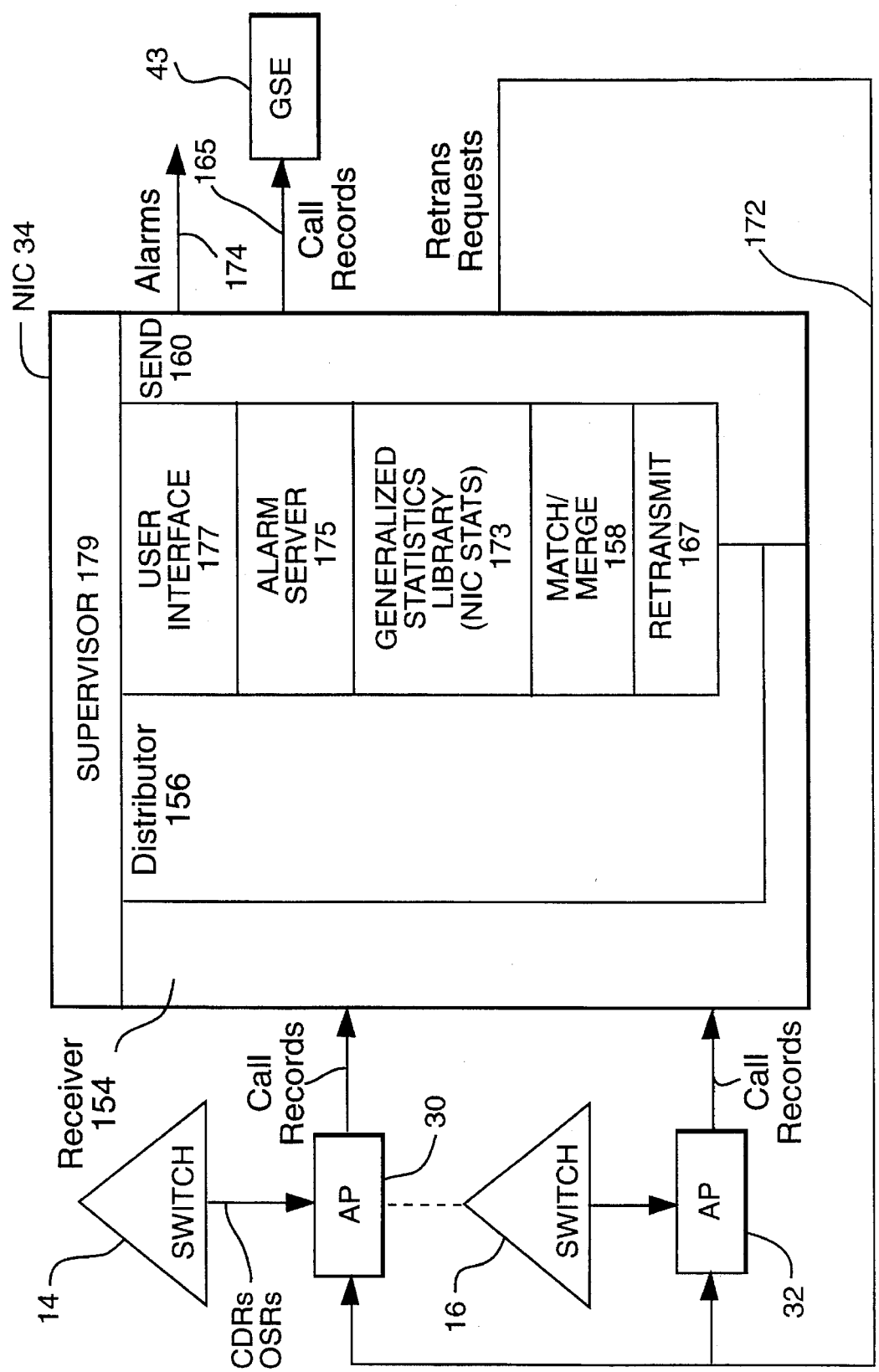
FIG. 8 is a block diagram illustrating, in greater detail, the various functions of the network information concentrator.

FIG. 8 is a block diagram of the architecture which shows the NIC 34 in greater detail. Although the NIC is shown as a single functional unit, it is, in fact, a distributed processor, such as a cluster of IBM RS 6000 units—Model R24. Specifics concerning the various sections of the NIC are treated hereinafter, with reference to FIGS. 9 et seq. The NIC 34 collects a call record data from the adjunct processors (AP 30). The call record data is obtained from the network which is involved in the path of a call. The AP call records are input to a receiver section 154 of the NIC. The switch 14 is one type of network element. The receiver section provides the necessary handshaking signals with the various network elements to effect data input to the NIC. The succeeding NIC section, namely the distributor 156, identifies the type of record being processed.

A processor 158 of the NIC performs a match/merge operation of call records generated by network elements. As a result, when a particular call is handled by various elements in the network, the call records are merged by the match/merge 58 so that they may be forwarded as a matched record. A send section 160 of the NIC 34 communicates call records to the generalized statistics engine (GSE) 43 at output 165.

If missing call record data is detected, a re-transmission request may be made to the receiver section 154 of the NIC 34, which will re-transmit the requested call record data, if it is present in the NIC. Otherwise, the NIC 34 generates the corresponding re-transmission request along line 172, which is fed back to the adjunct processors which store past call record data. Upon receipt of such a re-transmission request by the AP, it re-transmits the requested missing call record data to the receiver section 154 of NIC 34. The re-transmission of requested missing call records is handled through the re-transmit section 167 of the NIC 34. A traffic processor (not shown) also receives statistics concerning NIC event records (NERs). These are provided by the statistics library section 173 of the NIC that receives specific call records from the APs.

An alarm server 175 monitors the operation of the adjunct processors and the network elements. In the event of a malfunction or alarm condition, an appropriate signal is sent to a network management platform (not shown).

The timing for all communication between the network elements, the NIC sections, and the platforms and processors connected to the NIC output are handled by the distributed processor supervisor section 179 of the NIC 34.

Receiver Subsystem

Data Flow for the Receiver Subsystem

Figure 9:
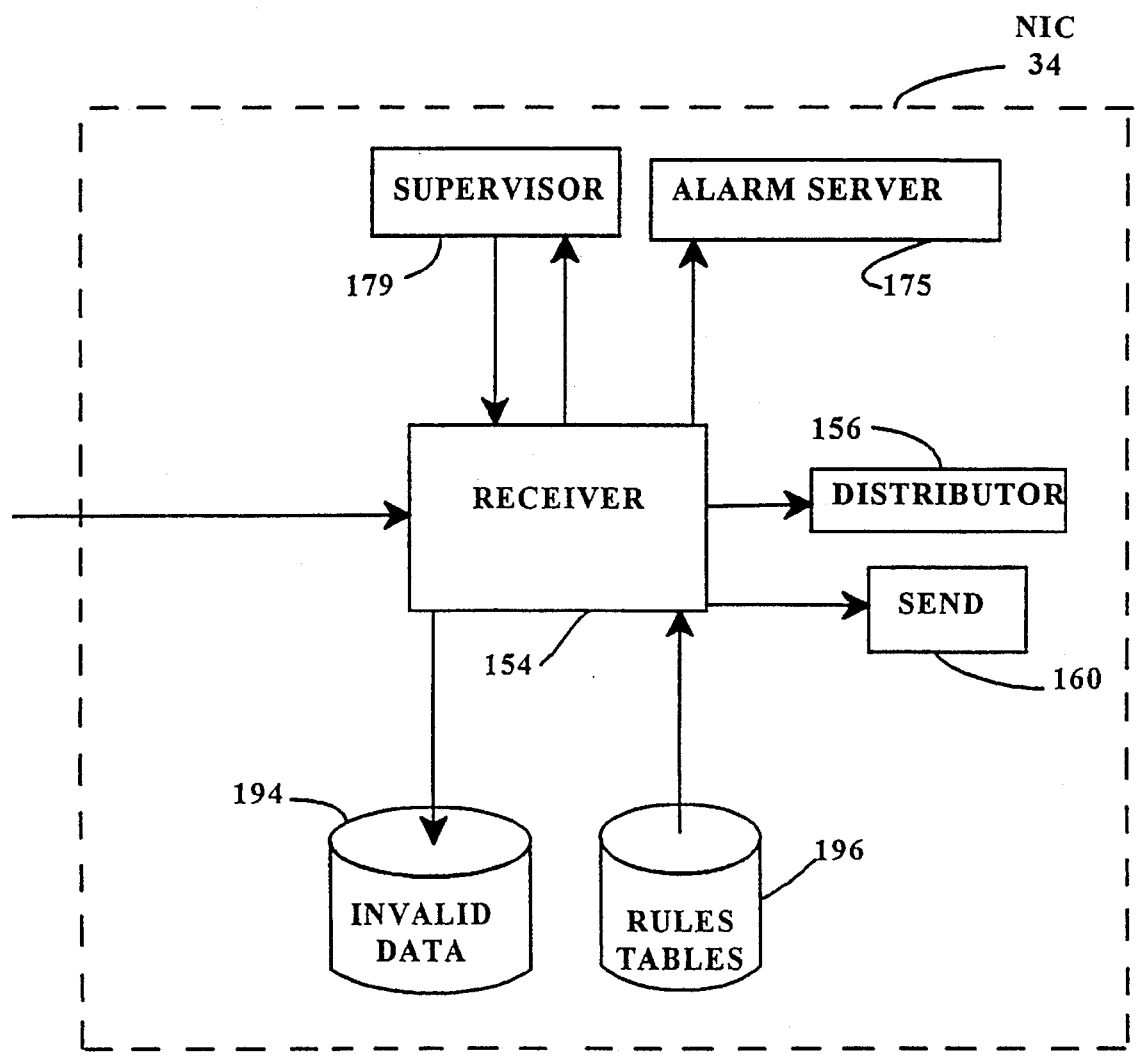
FIG. 9 is a data flow diagram for the receiver subsystem of the NIC.

FIG. 9 is a data flow diagram for the receiver subsystem. The receiver subsystem is responsible for accepting connection/transmission/rejection requests and data from external clients and providing a consolidated feed to internal clients. The feed between the adjunct processor 30 (FIG. 8) and the receiver subsystem primarily contains call records produced at the various switch sites. Adjunct processors that initiate a connection to the NIC are required to pass a registration message once a physical connection is established. This connection also receives retransmission rejection messages and retransmission data from the APs.

A number of subsystems are shown in FIG. 9 within the dotted block of NIC 34, and these are indicated by four rectangular blocks. These four subsystems are to be individually discussed hereinafter. However, like the receiver, subsystems are processes formed by a cluster of digital processors, such as four RS 6000 processors manufactured by IBM and denoted as a Model R24 cluster. The first of the receiver related subsystems includes the supervisor 179 which stores registration information from the receiver. In case of retransmission requests, the supervisor knows which adjunct processor is involved. In the case of the output from the supervisor 179, this connection provides an input shutdown message to the receiver subsystem. The receiver will then finish vital internal functions and then shut itself down. In the case of the input to the supervisor, an internal feed is indicated which contains the registration and deregistration messages received from all NIC external clients. The supervisor will accept and hold this information and provide it to internal clients.

The alarm server 175 receives alarm messages generated by the receiver subsystem, and these may be related to various errors detected by the receiver. Invalid data 194 may be stored on disk and represents data that cannot be processed upon receipt by the receiver subsystem. The rules table 196 represents a hard disk output to the receiver 154 containing the receiver's rules of operation, initial configuration data, thresholding information, and subsystem control information. These rules are table driven, and read into memory from the receiver's rules files at subsystem startup.

The distributor subsystem 156 is fed data from the receiver which corresponds to a consolidated feed of all AP call records. The send subsystem 160 receives data from the receiver 154 and contains reject messages from the APs.

Process Flow for the Receiver Subsystem

Figure 12:
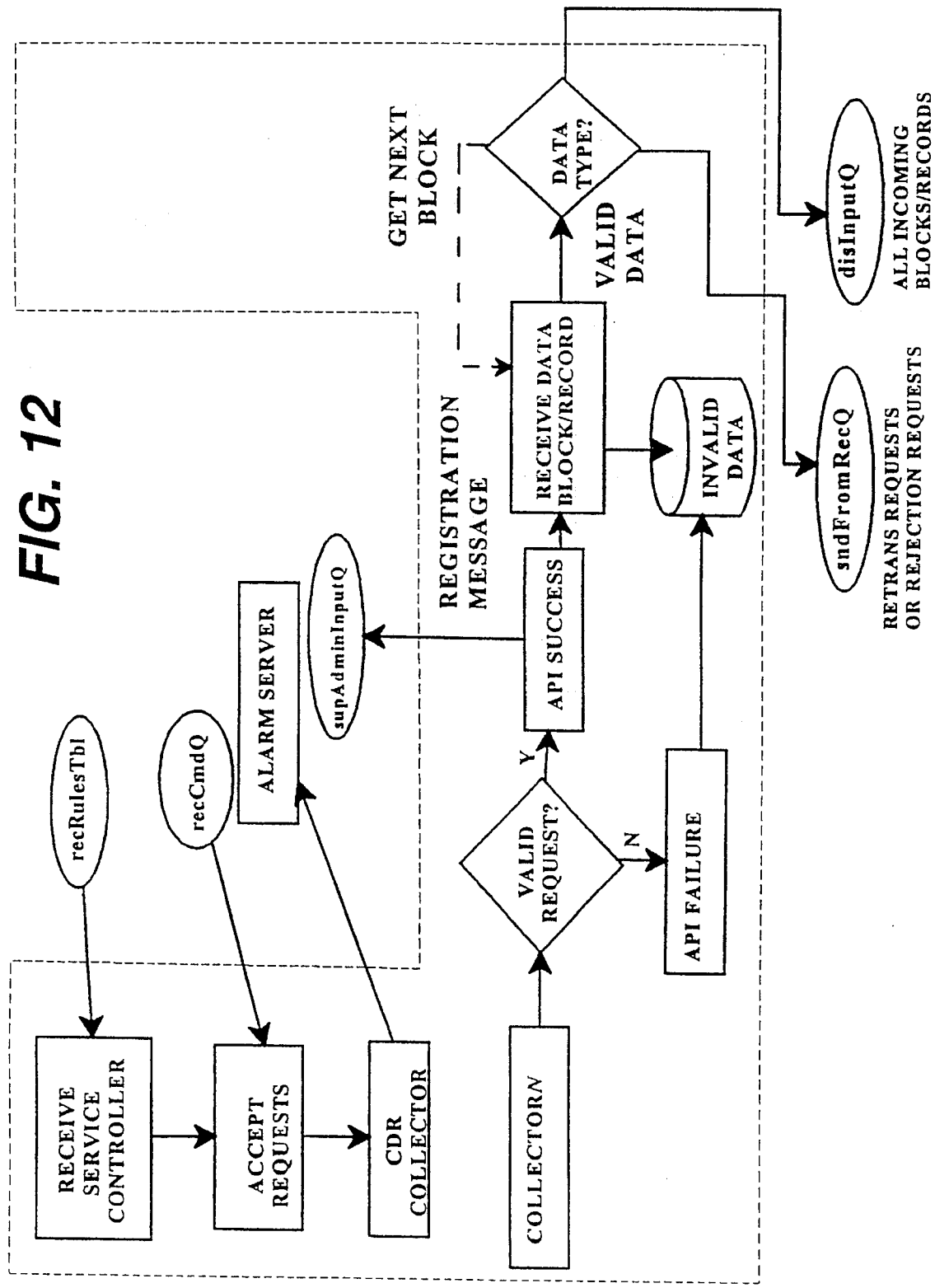
FIG. 12 is a process flow diagram for a receiver subsystem of the NIC.

FIG. 12 represents a process flow diagram for the receiver subsystem. The receiver subsystem is responsible for accepting connection, retransmission, and rejection requests as well as data from external clients and providing a consolidated feed to internal clients. This process only looks at common and client specific application program interface (API) headers it receives to determine the appropriate internal client queue.

The Receive Service Controller function of the receiver subsystem will be started by the supervisor and will run until requested to shutdown. This routine is responsible for performing all the administrative startup and initialization functions of the receiver. If a terminal error is encountered during subsystem startup, an alert is logged and the routine will shut itself down. Fatal errors such as no configuration files, or an unsuccessful attempt to attach to interprocess queues, will generate a critical alarm to the alarm server. The receiver will then shut itself down.

The Accept Requests routine will be executed continuously or until the supervisor requests it to stop. It will be responsible for listening to a UNIX or well-known port for requests to connect to the NIC service. It is this routine's function to accept all incoming connections and start a collector process to manage that connection. After the collector is started, the Accept Request routine will have no other dealings with that specific connection.

It is important to note that no connections are refused by this routine (i.e., no connections are actually accepted on the well-known NIC port). If this routine were to refuse a connection, and the client does not detect the denial, the NIC well-known port would be unavailable to other clients for a time-out period. By having the collector accept all connections and determine platform compliance, it is ensured that an incoming port is always available to accept new connection requests.

The collector processes started by this routine will function as long as the client continues to transmit data. If a service wants to shut down a receiver process, it will inform this routine and the appropriate collector will be notified. The Accept Requests routine will notify collector processes of a shutdown request and wait for them to stop themselves. If the collectors have not stopped after a time-out period, this routine will force them to shutdown and then stop itself.

The CDR Collector processes are started by the Accept Requests routine. They are responsible for receiving data off a dedicated incoming communications port and sending it on to either the distributor or sender input queue. Collectors will be started and pass the connection information from the client. The collector then accepts the connection requests on its own port (not the well-known port the receiver Accept Requests routine listens to). The connection is then complete and the collector can accept information from the client.

In the Valid Request step, the client is required to send a connection registration message to the NIC once the physical connection is established. If the collector process determines the message conforms to the specification, a confirmation message is returned to the client by the API Success routine. Messages that do not conform to the message format are sent to the AP Failure routine to process a rejection message.

Through the API Success routine the collector process will send a positive registration message to a client that sends a valid registration message. Once the client receives this message, they may begin transmitting data to the collector process. At this point, the collector sends the entire registration message up to the supervisor.

Through the API Failure routine, the collector process will send a registration message to a client that sends an invalid registration message. The receiver collector process will then close the connection it received the registration message on, log the alert to the alarm server, and terminate itself.

During the Receive Data Block/Record routine, the collector process will then read the common API header off the incoming connection and determine what the clients' API should look like. If the received header does not conform to the pre-determined specification, the block is considered invalid and the contents will be sent to the invalid data file. The common API header describes how much information is contained in the following structure. The entire structure is read off the incoming connection before continuing to the next step.

When the collector process reaches the Data Type step, the client specific header and data structure have been received and the application now needs to decide whether the data is a retransmission/rejection message for the send subsystem or a normal/transmission block for the distributor subsystem. If the retransmission bit exists in the API structure for this data structure and it is set to true, the data is either a retransmission/rejection message or retransmitted call records from the adjunct processor. Non-data blocks with this bit set are only sent to the send subsystem's input queue. All other data received are sent to the distributor subsystem's input queue.

Distributor Subsystem

Data Flow for the Distributor Subsystem

Figure 10:
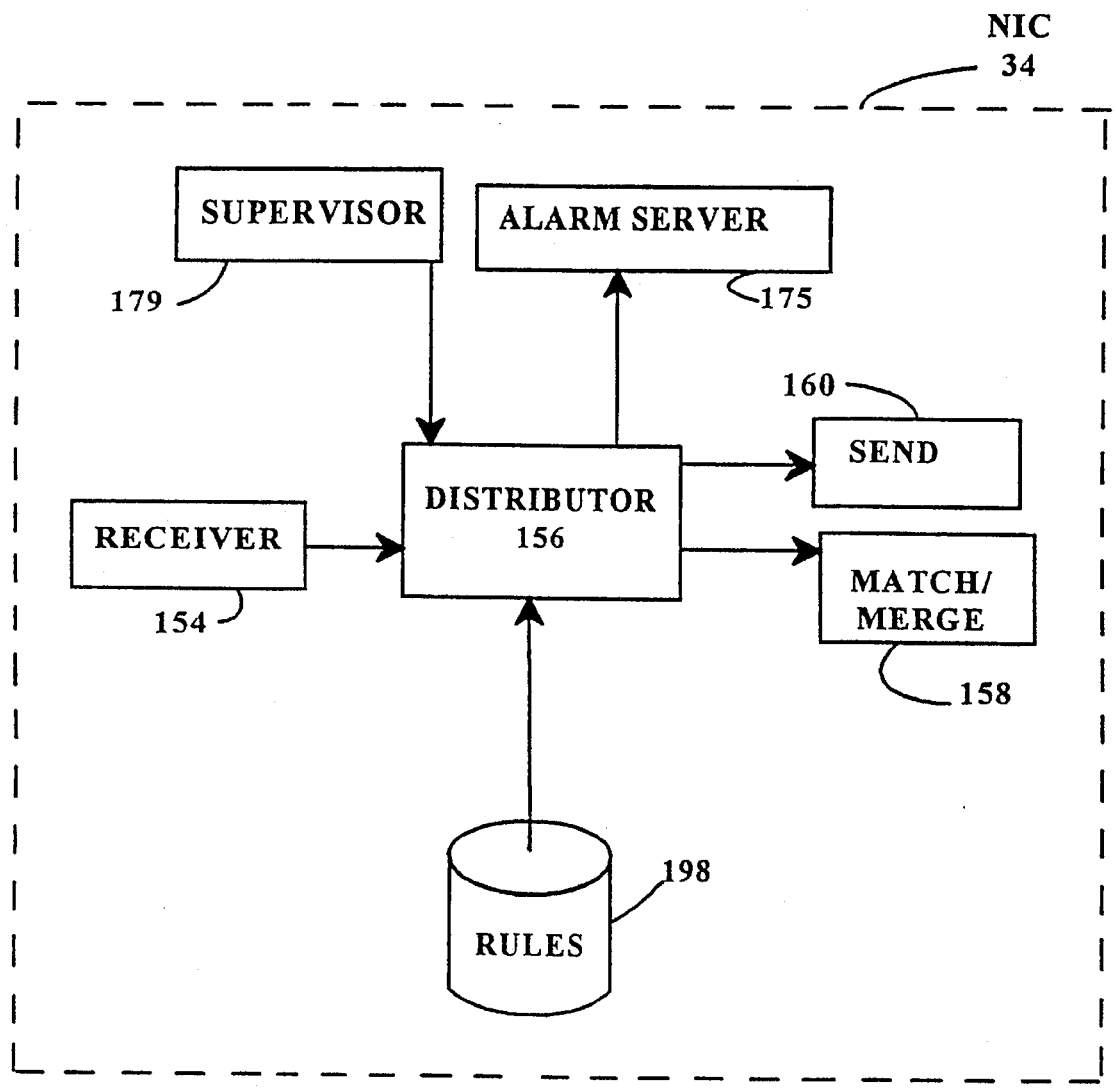
FIG. 10 is a data flow diagram for the distributor subsystem of the NIC.

FIG. 10 illustrates a data flow diagram for the distributor subsystem. Contiguous blocks of call record (CR) data are passed from the receiver subsystem to the distributor subsystem. Rules tables, as in the case of other subsystems of the present invention, are table driven processes, in this case governing the distributor subsystem. Rules will be written to memory from rules files stored on a hard disk 198. There is one distribution rule file for each set of client-based filtering criteria. Each of the table files contains a list of record classifications to be routed to a particular client. There is also a general rule file containing configuration information.

The supervisor subsystem output consists only of shutdown requests. Appropriate CRs will be sent to the match/ merge subsystem 158. Appropriate data for the generalized statistics engine 43 are sent to the send subsystem. All alarms generated by the distributor subsystem will be sent to the alarm server.

Process Flow for the Distributor Subsystem

Figure 13:
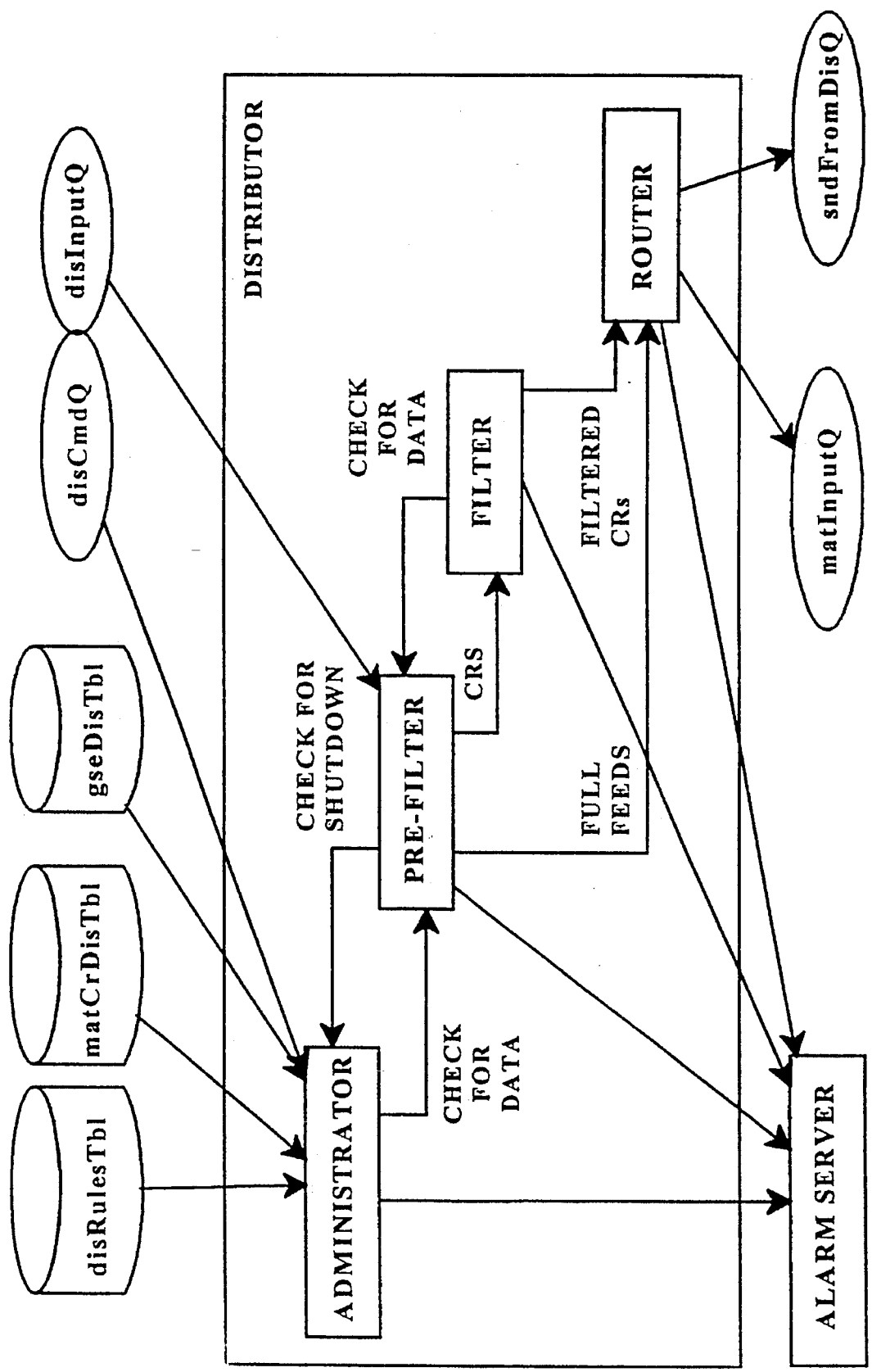
FIG. 13 is a process flow diagram for a distributor subsystem of the NIC.

Referring to FIG. 13, the Administrator module is responsible for the initialization and shutdown of the distributor subsystem. The administrator will first read all appropriate tables into memory. These tables will include disRulesTbl, matCrDisTbl, and gseDisTbl. The disRulesTbl table will contain all configurable information including threshold information and host distribution table names. The matCrDisTbl client-based distribution table will define all CR classifications that will be sent to the match/merge subsystem. The gseDisTbl client-based distribution table will define all CR classifications that will be sent to the send subsystem for the GSE client. The administrator will call the DisReadTable module to read in a set of client-based record classifications from a distribution table.

Next the administrator will connect to the disCmdQ, disInputQ, matInputQ, and sndFromDisQ queues. The disCmdQ queue is the command queue for the supervisor subsystem to notify the distributor subsystem to shutdown. The disInputQ queue is the data queue for the receiver subsystem to feed data records to the distributor subsystem. The matInputQ queue is the CR and BDR feed to the match/merge subsystem. The sndFromDisQ queue is the data feed to the send subsystem from the distributor subsystem. After connecting to these queues, the administrator will attempt to read a message from the supervisor command queue disCmdQ. If there is no command message, the administrator will process it appropriately at that time. In a simplified version of the system, the only command messages expected by the distributor subsystem are shutdown requests. There will be two types of shutdown requests for the distributor subsystem, hard and soft. In the event of a soft shutdown request, the distributor will finish processing all data stored in volatile memory, compile a shutdown alarm, and send the alarm to the alarm server, and then shutdown. In the event of a hard shutdown request, the distributor will compile a shutdown alarm, send the alarm to the alarm server, and then shutdown. If there is no command message from the supervisor subsystem, the administrator will call the pre-filter to process incoming records.

The Pre-Filter module is called by the distributor administrator to process record data. The pre-filter will first initiate a timer to designate when to return control to the administrator to check for a supervisor command message in the disCmdQ queue. This timer will be set to a configurable time. This timer will be checked before reading each message from the disInputQ queue. If the specified time has elapsed, then the pre-filter will return control to the administrator.

If the timer has not elapsed, then the pre-filter will attempt to read a message from the disInputQ queue. This queue is the main data feed from the receiver subsystem to the distributor subsystem. If there is no message in disInputQ queue, then the message type and data type fields in the API will be examined. If the message type indicated retransmitted data, then the pre-filter will ensure that the retransmitted data block is sent to all of the clients who want a full feed of all retransmitted data.

The Filter module is called by the distributor pre-filter when CR data needs to be broken down into filtered feeds. CR data marked as retransmission data will not be broken into filtered feeds in a simplified version of the system. Match/merge and GSE will be the only recipients of filtered record feeds in a simplified version of the system. Once the filter receives a block of CRs from the pre-filter, it will reference the client-based distribution tables in memory to classify match/merge and GSE records.

For each record in the data block, it will traverse the match/merge distribution table, attempting to classify the given record. The filter will traverse the table until a match is made, or the end of the table is reached. If a match is made, then that particular record will be added to the match/merge filtered data block. The next record in the original data block is compared with the entries in the match/merge table. This continues until a match/merge classification has been attempted for every record in the original data block. Next, the router will be called to send the constructed block to the match/merge subsystem.

For each record in the data block, the filter will traverse the GSE distribution table, attempting to classify the given record. If a match is made, then that particular record will be added to the GSE filtered data block. This continues until a GSE classification has been attempted for every record in the original data block. Lastly, the router will be called to send the constructed block to the GSE subsystem.

Classifications using the distribution tables will be accomplished by referencing a nibble and listing the values it should have. For each classification in the distribution tables, there will be one or more criteria, and then an end flag. Each criteria will contain a nibble offset, and a 16-bit field mapping out the desired values for that particular nibble. If a record satisfies all of the criteria in a given classification, then that record will be sent to the appropriate client.

The Router module is called by other modules in the distributor subsystem. The calls to router must pass a destination and a data block. The pre-filter may send full feeds to match/merge by passing the data block to the router, and designating match/merge as the destination. Filter may send filtered records to match/merge and GSE by passing the partial data blocks to router and designating match/merge or GSE as the destination. The router will populate API fields appropriately before sending the data. This may require traversing through a data block to get a record count. If the router encounters a problem, it may compile its own alarm message and send it to the Alarm Server.

The Send Subsystem

Data Flow for the Send Subsystem

Figure 11:
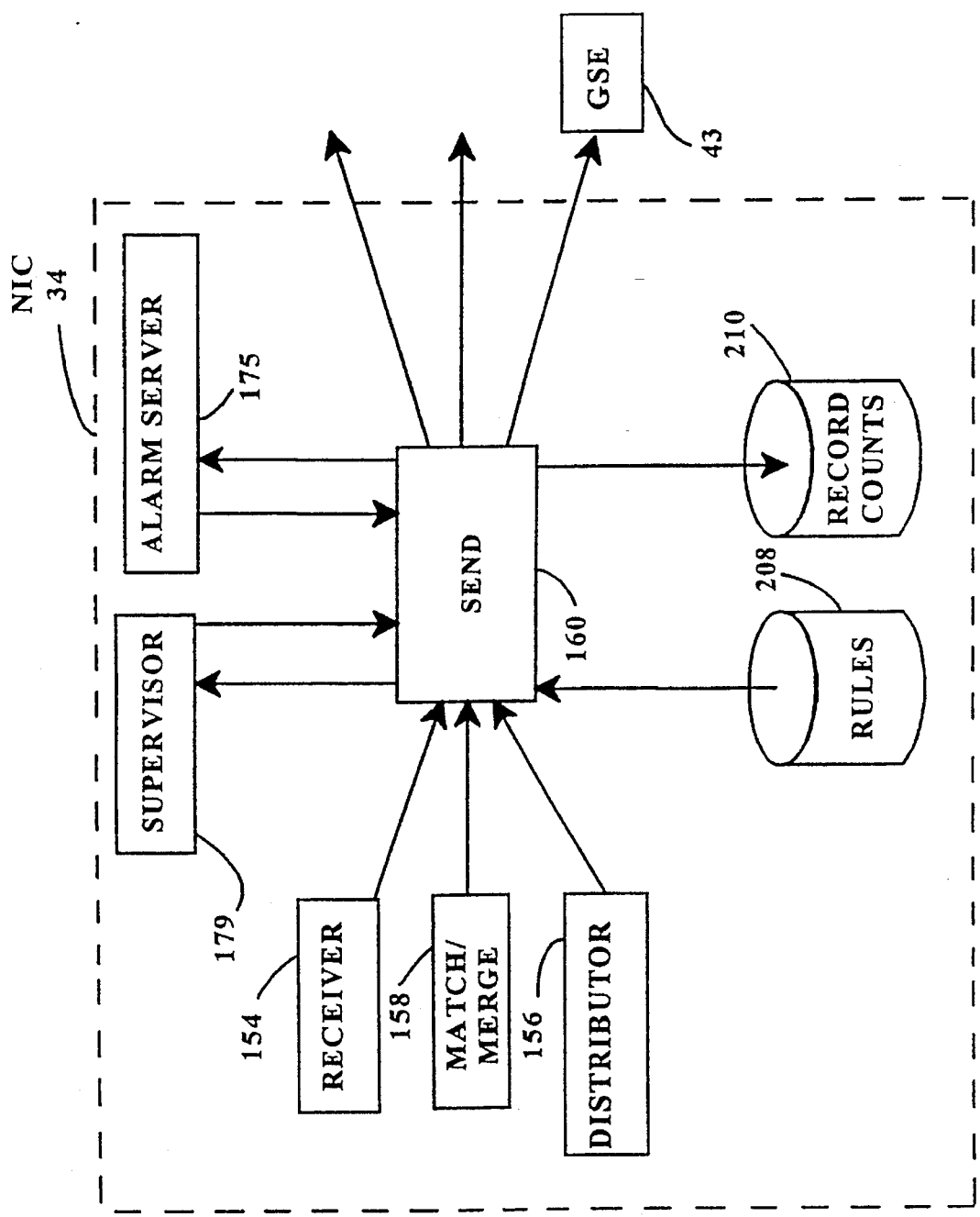
FIG. 11 is a data flow diagram of the Send subsystem.

FIG. 11 is a data flow diagram of the Send subsystem 160. Basically, the Send subsystem performs the converse function of the Receive subsystem. Namely, to transport the output of the NIC to downstream client subsystems. All retransmission rejects from the APs are passed to the Send subsystem by the receiver subsystem. All call records received from the APs and GSE specific call records will be passed to the Send subsystem. Rules governing the Send subsystem are stored on hard disk 208. These rules may pertain to the record count generation time for NIC event records (NERs), the record count generation time for each client, etc.

Various outputs are shown from the Send subsystem 160 in FIG. 11. These include a hard disk 210. The record sent to each client is counted and maintained by the Send subsystem, on the disk. The generalized statistics engine (GSE) receives specific call records from the APs.

Process Flow for the Send Subsystem

Figure 14:
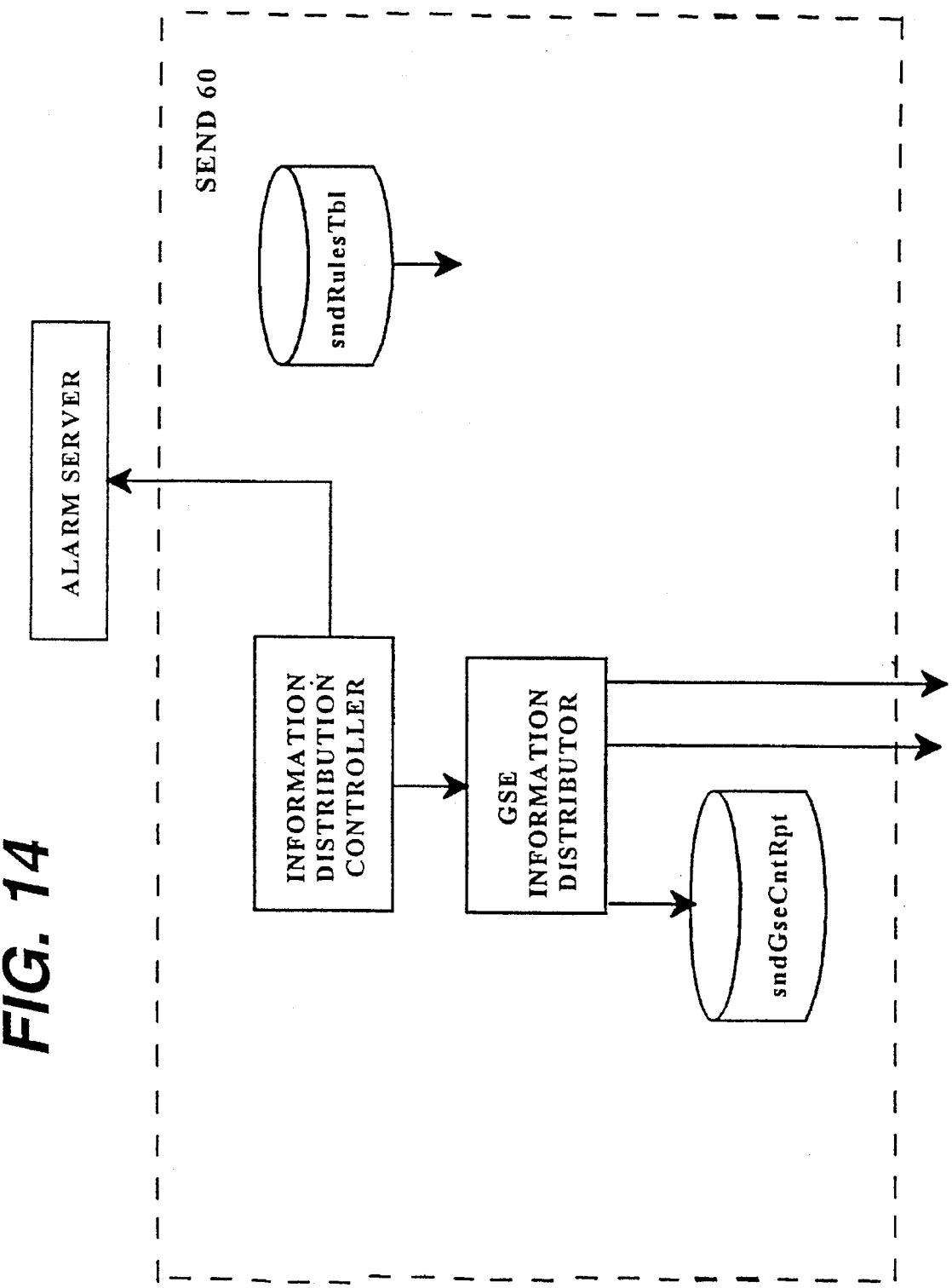
FIG. 14 is a process flow diagram for a send subsystem of the NIC.

In FIG. 14, a process flow diagram for the Send subsystem 160 is illustrated. As indicated, it comprises a number of modules to be discussed as follows.

The Information Distribution Controller process is responsible for starting and maintaining its child process (Information Distributor).

Figure 15:
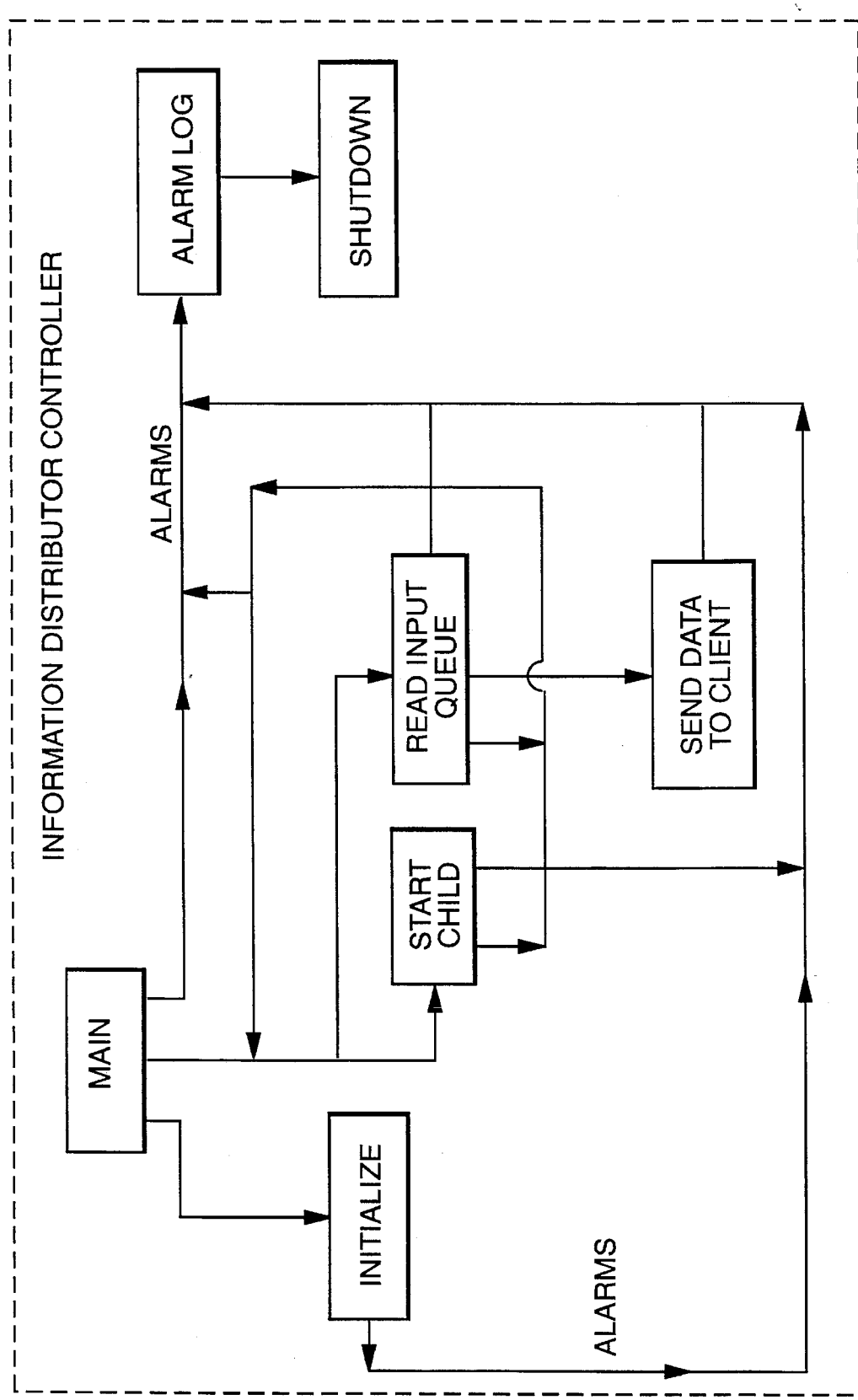
FIG. 15 is a process flow diagram for an information distribution subsystem of the NIC.

In FIG. 15, the main module will call necessary modules to handle the initialization, signals, and its input queues. After initializing, the main module will forever receive data. The queue input will be handled by calling the Read Input Queue module.

The Initialize module will be called by the main module to read all the files, open all the queues, initialize global variables and to create and initialize shared virtual memory. The shared virtual memory will be used to maintain information on the child processes.

The read input queue module is called by the main module whenever there is a message on any of its input queues. There are two types of messages: the shutdown message and the client data message. Whenever a shutdown message is received, this module will log the condition and terminate by calling the Log Alarm module. The client data message will be handled by looking at the API to determine the data destination and sending the data to the appropriate Information Distributor process handling the destination connection. This module will also detect any data with multiple destinations and clone as necessary.

The log alarm module is called by all other modules whenever an error condition is detected. This module will log the alarm to the Alarm Server and determine if the error condition is fatal. The Shutdown module will be called for all fatal conditions. The Shutdown module is called by the Log Alarm module whenever a fatal condition is encountered. This module is responsible for cleaning up and terminating the process. A termination includes notifying the child process of the shutdown condition and terminating any child process underway after some rule table determined time. This module will terminate the Information Distribution Controller process after all its child processes (Information Distributor) terminate.

Figure 16:
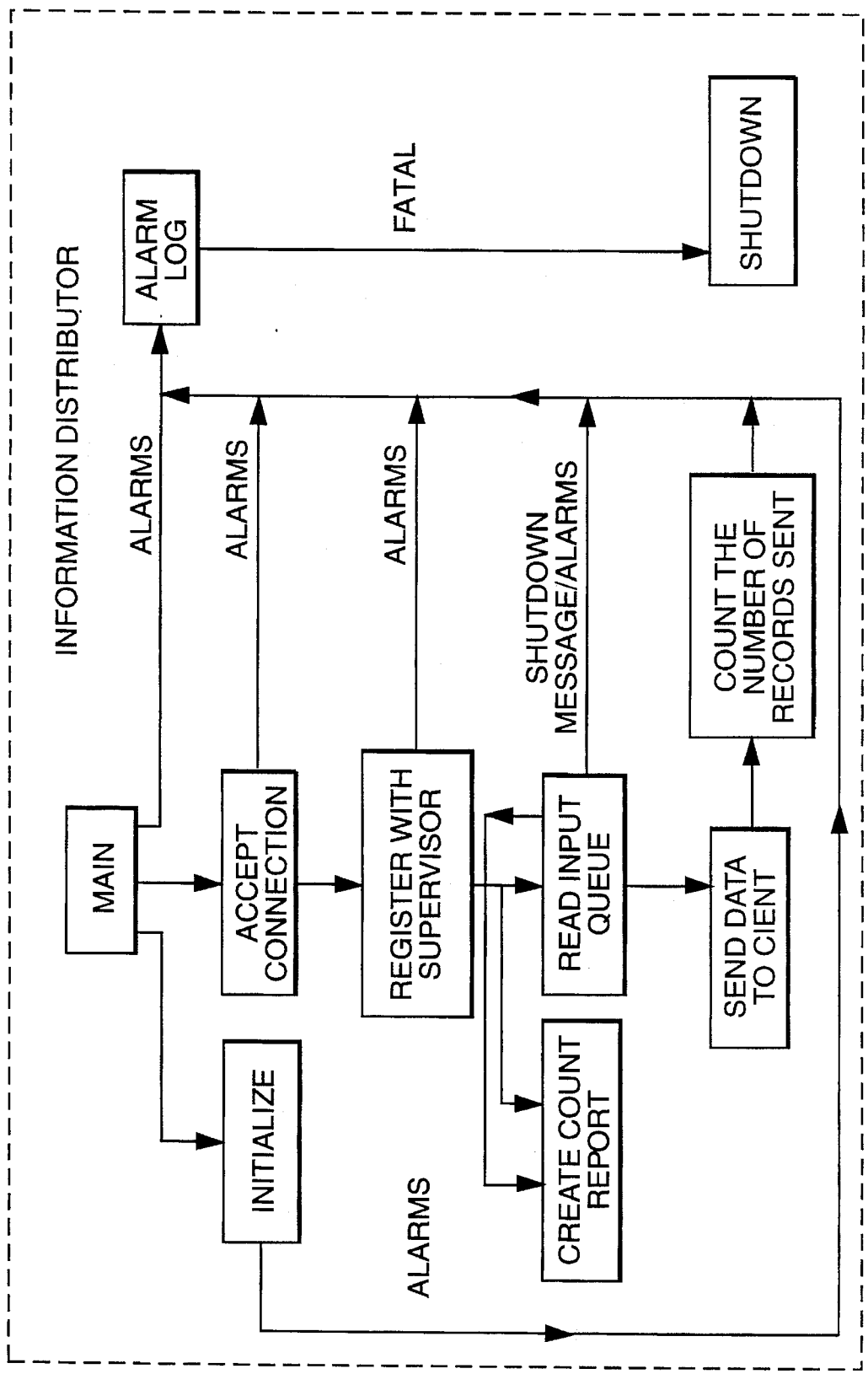
FIG. 16 is a process flow diagram for a more detailed information distribution controlling subsystem.

FIG. 16 illustrates the Information Distributor processes started and terminated by the Information Distribution Controller process. The Information Distributor process handling the GSE connection will transmit a subset of Call Records received from the APs to the GSE. Connections to the GSE will be established and maintained by the client. The connections between the NIC and the clients will be initiated and maintained by the clients. The following discussion highlights the modules of FIG. 16.

The main module will call necessary modules to handle the initialization, signals, and its input queues. The main module will call the Accept Connection module to accept the connection from the clients and to send a registration response to a valid registration request message. Once the connection is established, the main module will call the Register with Supervisor module to notify the Supervisor subsystem of the connection success status. After the registration with the Supervisor, the main module will loop forever to handle both the incoming data from the Information Distribution Controller process and the count timer. The Read Input Queue module will be called to handle the incoming data and the Create Count Report module will be called to handle the count timer.

The initialize module will be called by the main module to read all the files, open all the queues, initialize global variables and to create and initialize shared virtual memory. The shared virtual memory is used to keep the number of records sent to the client.

The accept connection module will be called by the main module to accept a connection request from a client. Once the connection registration request message is verified, this module will send a registration response to the client to complete the connection. An invalid registration request will invoke "Log Alarm" with a fatal condition set.

The register with Supervisor module is called by the main module after the connection to the client is established. This module will send a registration message to the Supervisor to announce the successful connection condition. The information will also contain the client the process is currently serving.

The create count report module is called by the main module whenever a count timer expires. This timer indicates a count reporting event. The total number of records sent to the clients are calculated and either sent to the Supervisor or are created into a count report.

The read input queue module is called by the main module whenever there is a message in the input queue. There are two types of inputs: a message to terminate and client data messages. The termination messages are handled by calling the Log Alarm module with a fatal error condition set. The client data messages are sent to the clients by calling the send data to client module.

The send data to client module is called by the Read Input Queue module to handle the client data messages. This module will send the data to the client it is currently serving. If send is successful, the number of records sent will be counted by calling "Count the number of Records sent" module. The count number of records sent module will count the number of records sent to the clients. The Call Records from the APs will be counted on the basis of their switch. The record counts will be stored in the shared virtual memory.

The log alarm module is called by all other modules whenever an error condition is detected. This module will log the alarm to the Alarm Server and determine if the error condition is fatal. The shutdown module will be called for all fatal conditions. The shutdown module is called by the Log Alarm module. This module is responsible for cleaning up and terminating. This module will deregister with the Supervisor before terminating the process.

It should be understood that the invention is not limited to the exact details of construction shown and described herein for obvious modifications will occur to persons skilled in the art.

We claim:

1. A system for selectively obtaining telephone network call statistics, comprising:
   service control management means (SCM) for conveying routing information, regarding virtual phone numbers, to a data access point (DAP);
   a adjunct processor (AP) for storing call records generated by an originating switch;
   a network information concentrator for creating buffers for call detail records (CDRs) from an originating switch of the telephone network, the network information concentrator further including—
   (a) a receiver section for receiving AP call records;
   (b) a distributor section for identifying the type of record being processed;
   (c) a match/merge section for merging the call records generated by various network elements handling a particular call, and forwarding the result as a matched record CDR buffer; and (d) a send section to output the CDR buffer downstream of the network information concentrator;

a distributed processor serving as a generalized statistics engine and including—

(e) a receive node, receiving CDR buffers, for executing a first process that unbundles individual CDRs from received buffers, and a second process that checks each unbundled CDR against a look up table stored in a database for selecting the calls to be tracked by the system, the second process further obtaining from a database, preselected statistics for which tracked call counts are to be updated;

(f) a branch node for receiving decisional rules from the database and determining the existence of preselected statistical network events for each tracked call unbundled CDR, a count for the statistical network event being incremented upon determination of its occurrence;

(g) a shipping node for formatting statistical count information into a preselected message format;

(h) a corporate node having a first process for signaling the end of a statistic acquisition cycle for the receive node, the SCM further providing predetermined enhanced data, absent from an unbundled CDR, to the corporate node during a second process;

means for transferring updated enhanced data to the database from where it is further distributed to the receive node; and server means for receiving the statistical count information in the preselected message format and making the statistical count information available to downstream users.

2. A system for selectively obtaining telephone network call statistics as set forth in claim 1 wherein the adjunct processor is connected between the originating switch and the network information concentrator for storing the CDRs generated by the originating switch.

3. In a distributed processor system, serving as an engine for obtaining statistical counts of telephone network events, from call detail records (CDRs), generated by an originating network element, a method comprising the steps:

conveying routing information, regarding virtual phone numbers, through service control management to a data access point (DAP);

storing CDRs, generated by originating switches, in corresponding adjunct processors;

concentrating CDRs at a single point for creating buffers for CDRs from an originating switch of the telephone network, the concentrating further including—

(a) receiving adjunct processor (AP) call records;

(b) identifying the type of record being processed;

(c) merging the call records generated by various network elements handling a particular call, and forwarding the result as a matched record CDR buffer; and (d) sending the CDR buffer downstream;

establishing a receive node, receiving CDR data generated by an originating network element, for executing a first process that unbundles individual CDRs from received buffers and a second process that checks each unbundled CDR against a look up table stored in a database for selecting the calls to be tracked by the distributed processor system, the second process further obtaining from a database, preselected statistics for which tracked call counts are to be updated;

establishing a branch node for receiving decisional rules from the database and applying the rules to the CDRs for determining the existence of preselected statistical network events for each tracked call, a count for the statistical network event being incremented upon determination of its occurrence;

establishing a shipping node for formatting statistical count information into a preselected message format;

establishing a corporate node for signaling the end of a statistic acquisition cycle for the receive node; and receiving the statistical count information in the preselected message format and making the statistical count information available at a server for distribution to downstream users.

4. The method set forth in claim 3 further comprising the step of creating buffers for call detail records (CDRs) from an originating switch of the telephone network.

5. The method set forth in claim 3 further comprising the step of providing a data access point (DAP) to furnish the originating switch with network routing information for each call handled by the telephone network.

6. The method set forth in claim 3 further comprising the step of grouping statistic information as a hierarchy including—

(a) individual network events pertaining to a particular number called;

(b) a service including a preselected group of events for the number called;

(c) a service vector including a preselected arrangement of services;

wherein the decisional rules, applied at the branch node, correspond to respective services.

7. The method set forth in claim 3 further comprising the step of:

(a) establishing count groups of individual events and their respective counts, for each service; and (b) storing count groups for a service vector in a corresponding count registry.

* * * * *